(No Model.) 3 Sheets—Sheet 1.

J. SIMSER.
CORN HARVESTER.

No. 495,526. Patented Apr. 18, 1893.

Witnesses
M. E. Taylor
Jno. K. Liggers

Inventor
James Simser
By his Attorneys,
C. A. Snow & Co.

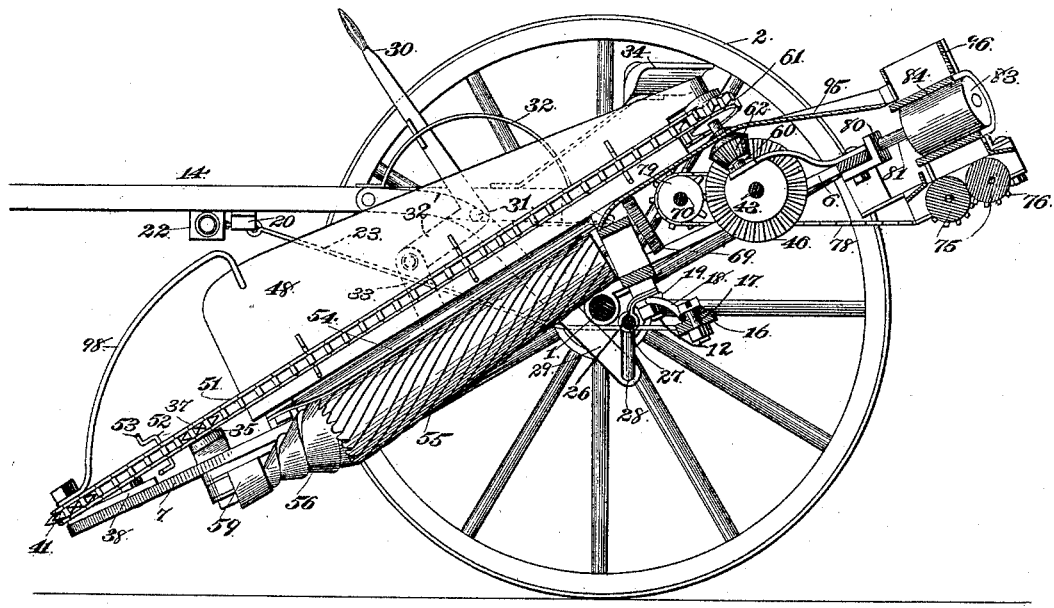

(No Model.) 3 Sheets—Sheet 3.

J. SIMSER.
CORN HARVESTER.

No. 495,526. Patented Apr. 18, 1893.

Witnesses

Inventor
James Simser
By his Attorneys,

UNITED STATES PATENT OFFICE.

JAMES SIMSER, OF ROCK ISLAND, ILLINOIS.

CORN-HARVESTER.

SPECIFICATION forming part of Letters Patent No. 495,526, dated April 18, 1893.

Application filed February 23, 1892. Serial No. 422,499. (No model.)

*To all whom it may concern:*

Be it known that I, JAMES SIMSER, a citizen of the United States, residing at Rock Island, in the county of Rock Island and State of Illinois, have invented a new and useful Corn-Harvester, of which the following is a specification.

My invention relates to improvements in corn-harvesters the objects in view being to provide a machine adapted to be drawn over the field of standing corn, and to grasp the stalks at a suitable point below the ears, strip the corn ears from the stalks, carrying the same to a suitable husking mechanism, and finally deliver the husked ears into a wagon or other receptacle following the machine, the stalks and husks being ejected.

Various other minor objects of the invention are in view, and which need not at this point be stated, but will appear in the following description, the novel features being particularly pointed out in the claims.

Figure 1:
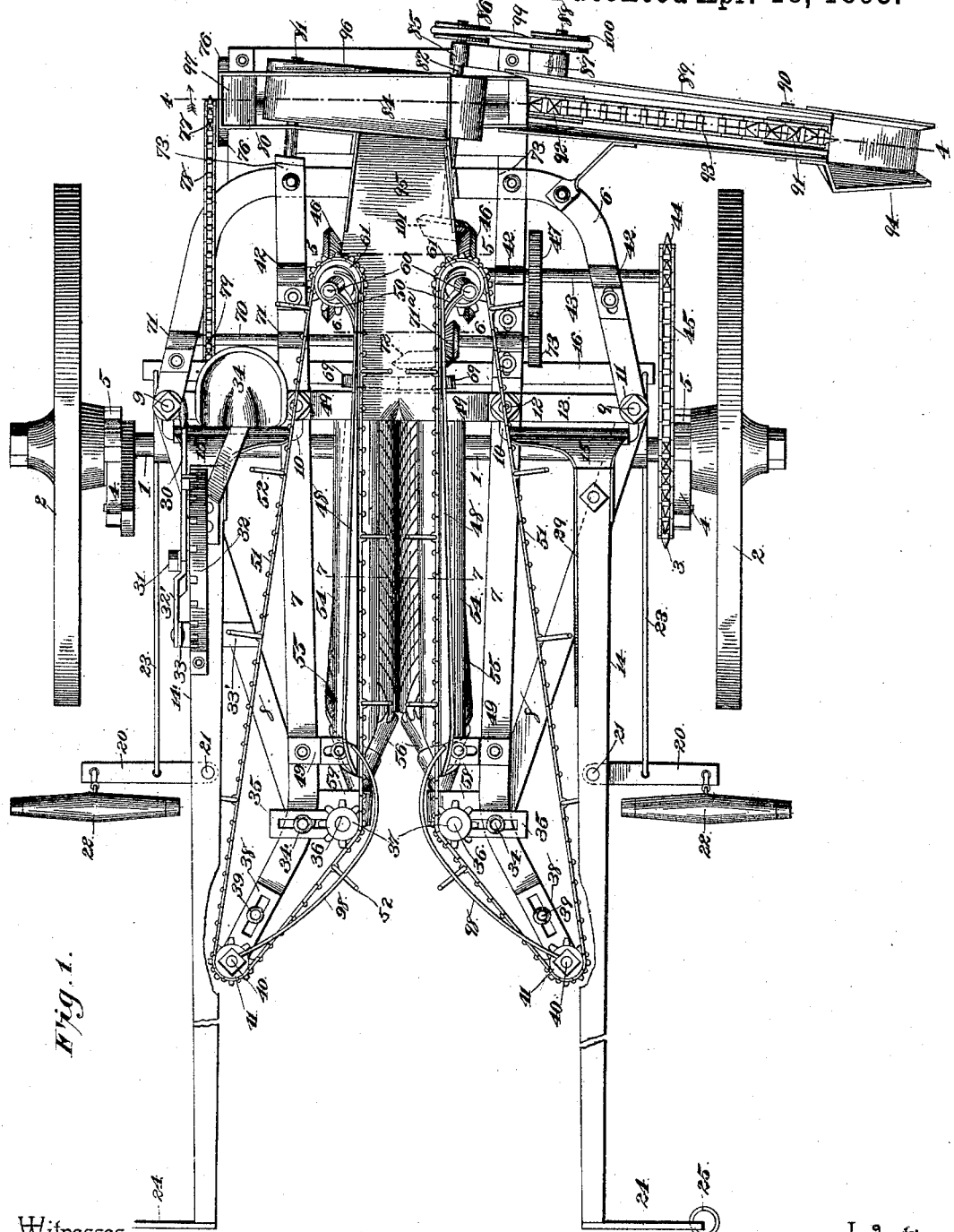
Figure 4:
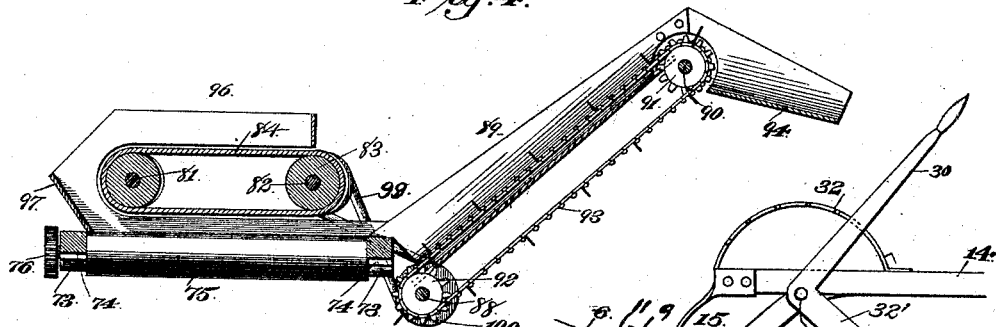
Figure 5:
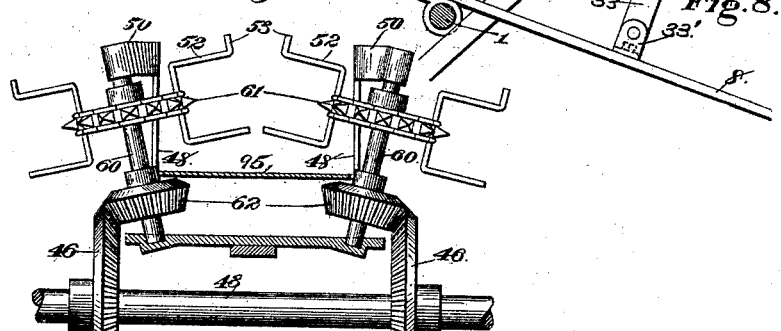
Figure 6:
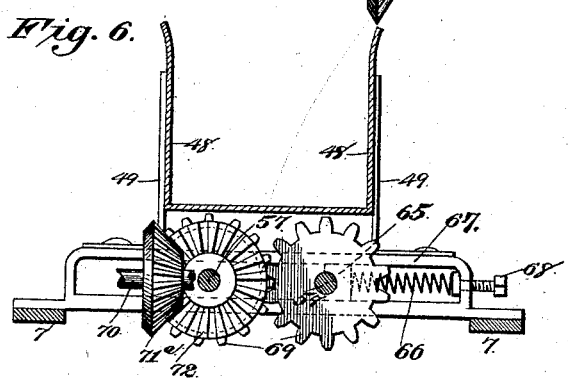
Figure 7:
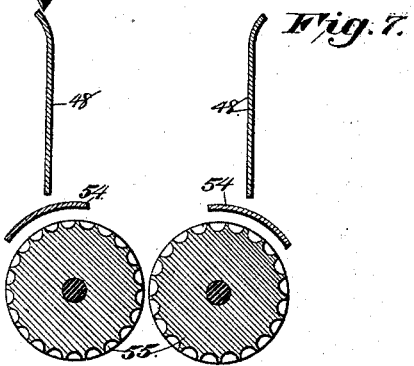

Referring to the drawings:—Figure 1 is a plan of a machine constructed in accordance with my invention. Fig. 2 is a longitudinal section through the center of the machine. Fig. 3 is a front elevation, the stripping frame of the machine being raised more than shown in Fig. 2. Fig. 4 is a section through the husking and elevating mechanism, the section being taken on the line 4—4 of Fig. 1. Fig. 5 is a transverse section on the line 5—5 of Fig. 1. Fig. 6 is a similar view on the line 6—6 of Fig. 1. Fig. 7 is a transverse section through the stripping-rolls on the line 7—7 of Fig. 1. Fig. 8 is a detail elevation partly in section illustrating the manner of controlling the elevation and depression of the stripper frame by a system of levers.

Like numerals of reference indicate like parts in all the figures of the drawings.

The axle 1 carries at its opposite ends the ground-wheels 2, each of which is loose thereon. A master-gear in this instance a sprocket-wheel 3, is located upon the axle at the inner side of the left-hand guide-wheel, and has pivoted at its outer side a pawl 4, the operative end of which engages the teeth 5 with which the hub of the left-hand wheel 2 is provided, so that as the machine is backed the wheels do not operate the shaft, but when drawn forward the left-hand wheel becomes locked with the shaft or axle and master-gear so that the latter moves with the wheel and in a manner hereinafter apparent communicates motion to the various mechanisms.

A U-shaped frame 6 is located at the rear side of the machine, and its terminals loosely engage the axle. Longitudinal bars 7, a pair of which is employed, are bolted at their rear ends to the U-shaped frame, at each side of the center of the latter, and extend over and in front of the axle, and at their front extremities diverge as shown in Fig. 1 of the drawings. Diagonal converging braces 8 are bolted to the longitudinal bars 7 at about the angles of the latter, and have their rear ends bolted as at 9 to the extremities of the U-shaped frame. U-shaped bars or coupling-rods 10 terminate in eyes 11, and through the outer eyes the bolts 9 also pass. The inner eyes of these coupling bars have bolts 12 passed therethrough, and also through a transverse bar 13 and the longitudinal bars 7. Draft-bars 14 are located at opposite sides of the center of the machine, and curved connecting plates 15 loosely connect with the coupling-bars 10 and at their upper ends with the rear ends of the draft-bars. A lever 16 is pivoted by a king-bolt 17 to the under side of a brace or yoke 18, the terminals of which form eyes 19, through which the bolts 12 extend. Draft-arms or levers 20 are pivoted as at 21 to each of the draft-bars 14, and in the outer ends of the same singletrees 22 are loosely connected. Link-rods 23 lead from the draft-levers 20 to the extremities of the lever 16. Arms 24 are located at the front ends of the draft-bars 14, and are provided with rings 25, to which the draft-animals are hitched. Bearing-clips 26 are mounted on the bolts 12, and receive a shaft 27, the ends of which are bent to form arms or links 28. Curved braces 29 are secured to these arms and at their upper ends are secured to the inner sides of the draft-bars.

As shown in Figs. 1, 2, 3, and 8, a bell-crank hand lever 30 is pivoted at 31 to the draft-bar 14 and is provided with a suitable bent catch for engagement with the arc-shaped rack 32 mounted also on the draft-bar 14. The forward end of the horizontal arm, 32′ of said lever 30 is loosely hinged to the upper end of a link 33, having in turn its lower extremity loosely jointed to the upper end of the rigid L-shaped bracket 33' bolted to the bar 8 on that side of the machine (see Figs. 1, 2, and 8). By operating the hand-lever, the stripper mechanism frame is raised or lowered at front, the braces 29 being held in place at their rear ends by the depending arms upon the shaft 27, while the independently movable draft-arms 20 are shifted to or from the evener-bar by the intermediate link-rods 23, owing to the distance between said draft-arms and the evener-bar being variable according to the movement of the framework. The shaft 28 is loosely mounted to turn independently of the axle, and the plates 29 which are fixed at their upper ends to the draft-bars 14, are loosely connected to the shaft, whereby as the stripper frame is adjusted by means of the hand-lever and the draft bars are moved forward or backward thereby (said bars being pivoted at their rear ends to the stripper-frame) the shaft and plates 29 adapt themselves to the relative positions of the stripper-frame and draft bars, and enable the latter to preserve their horizontal position. In other words, as the front end of the stripper-frame is depressed, the arms of the crank-shaft swing forward to accommodate the change of position of the draft-bars.

It will be seen that as the lever 30 is grasped by the driver, for whom a seat 34 is provided, and swung forwardly, the link connected to the elbow or lower branch of the lever depresses the frame of the machine at the front end thereof. This frame carries certain defined mechanism for gathering and stripping the ears of corn from the stalks, and therefore the mechanism may be presented at any desired angle so as to intersect the stalks at any point and thus insure the stripping of any ears, whether they be at the upper ends of the stalks or down near their lower ends.

Bolts 34 pass through the front meeting-ends of the bars 7 and 8, and upon these bolts are mounted for adjustment longitudinally slotted bearing-brackets 35, in the inner ends of which short vertical stub-shafts 36 are journaled, and accommodate small sprockets 37. At their forward ends longitudinally-slotted brackets 38 are adjustably mounted by bolts 39 passed through the brackets and bars 7, and these brackets are provided with short stub-shafts 40, each of which carries a small sprocket-wheel 41.

In bearings 42, formed upon the upper sides of the left arm of the frame 6 and upon the two longitudinal bars 7, a shaft 43 is journaled. This shaft at its left end, which is extended beyond the frame 6, carries a sprocket-wheel 44, which is connected with and driven by the master-gear 3 through the medium of an endless sprocket-chain 45. At each side of its center the shaft 43 has mounted thereon beveled gears 46, and just beyond the left-hand bar 7 is provided with a plain gear 47.

48 designates a pair of longitudinal guards, the upper edges of which are flared, as shown. These guards are supported by opposite pairs of brackets or short vertical standards 49, said standards being slotted, whereby through the medium of bolts the guards may be adjusted toward or away from each other. The rear ends of the guards support bearing-standards 50 at their outer sides, and inclined shafts 60 are journaled in these standards. These shafts near their upper ends carry sprocket-wheels 61, while their lower ends are provided with beveled pinions 62, which are engaged with and driven by the beveled gears 46 of the shaft 43. Endless belts 51 pass around the sprocket-wheels 61, 37 and 41, and these chains are provided at intervals with U-shaped engaging-spurs 52, the upper terminals or branches of which are upturned as at 53.

Suspended from the lower edges of the guards 48 are horizontally-disposed curved plates 54, best seen in Figs. 1 and 7. These plates are arranged directly over a pair of rearwardly tapered rollers 55, the front extremities of which are reduced or conical, and auger-like, as shown at 56. In rear of their conical portions the rolls are spirally grooved as shown. The rolls are mounted upon shafts 57, the front extremities of which take into a pair of brackets 58, and 59, the latter being provided with a follower-block 63, in rear of which a spring 64 is located, for the purpose of normally pressing the block against the shaft. These bearing-brackets are secured upon the bars 7 through the medium of the bolts 34. The bar 7 directly in rear of the shaft, is spanned by a transverse elongated plate 67, which supports the rear standard 49 to which the guards 48 are attached. This plate is provided with bearings for the reception of the shafts 57, and mounted for movement at one side of the right-hand bearing, is a follower block 65, pressed to position by a spring 66. This spring 66 and also the spring 64 at the opposite end of the shaft, may be controlled through the medium of pressure-regulating bolts 68.

At the rear ends of the two longitudinal shafts 57 a pair of gears 69 is located, said gears intermeshing as shown in Fig. 6, and by dotted lines in Fig. 1. Immediately in rear of these gears a transverse-shaft 70 is mounted in bearings 71, formed upon the right-hand arm of the U-shaped frame 6 and the two bars 7. This shaft carries a beveled gear 71ª, which engages with and drives a beveled gear 72, mounted upon the left-hand shaft 57, and clearly shown in Fig. 6, and by dotted lines in Fig. 1.

At the left hand end of the shaft 70 a small gear 73 is located, which meshes with and is driven by the gear 47 of the transverse shaft 43, and thus motion is imparted from the master-gear 3 through the chain 45 to the shaft 43, the gear 47, gear 73, shaft 70, gear 71, the gear 72, and from thence to the left-hand shaft 57 and its stripping-roll 55 and from the pinion 69 of the latter to the companion-pinion of the opposite stripping-roll, so that the two latter are driven in unison in contrary directions, and in the same direction as their screw or thread is disposed. It will also be seen that motion from the shaft 43 will be transmitted to the gears 46, from thence to the smaller gears 62, their shafts 60 and sprocket-wheels 61 and finally to the endless feed-chains 51.

To the rear extremities of the longitudinal bars 7 a pair of short longitudinal bars 73 is secured, the same being in a plane lower than the general framework of the machine. These bars have bearing-openings formed therein, and in the same a pair of shafts 74 is mounted for rotation; each of which carries a husking-roller 75. The right-hand extremities of the shafts are provided with intermeshing-gears 76, whereby motion is imparted from one to the other, and the advance shaft carries a sprocket-wheel 77, which is connected by a chain 78 with the sprocket-wheel 79 located upon the transverse shaft 70, so that as will be obvious motion will be imparted from the last mentioned shaft to the two husking-rolls, which revolve toward each other and will serve to tear the husks from the ears in a manner hereinafter apparent. A pair of brackets 80 serves to support a pair of shafts 81 and 82, which extend across and above the husking-rolls. These shafts are provided with pulleys 83, and the two are connected by an endless belt 84. The shafts 81 and 82 are set slightly at an angle to the rolls 75, so that the rolls revolving and the belt moving will twist the ear of corn as the same travels from one end of the rolls to the other. The left-hand shaft 82 is extended beyond its outer bearing 85 and is there provided with a pulley 86, and at its inner end with a gear 101 engaged and driven by one of the gears 46.

In a pair of brackets 87, extending from the left-hand bar 73, and shown in Fig. 1, a transverse shaft 88 is journaled. A conveyer 89 is inclined and projects from the shaft and adjacent bar 73, and at its upper end supports rotatably in suitable bearings a shaft 90, upon which is mounted a sprocket-wheel 91, a companion to which is designated as 92 and mounted upon the shaft 88. These sprocket wheels are connected by an endless conveyer or sprocket-chain 93. From the upper end of the conveyer a discharge-chute 94 laterally projects, and is designed to discharge into a wagon or other receptacle designed to travel at the side of the harvester. The plates 54, heretofore described, are arranged some distance apart throughout the length of the rolls 55, but near the rear ends of the same join a continuation of the plates, which is a feed-table 95, the rear end of which is curved, as shown, and terminates immediately above the upper end of the endless belt 84. This belt 84 is surrounded by a wall 96, whereby the ears are maintained upon the belt, and this wall terminates or forms at one end of the husking-rolls 75 a hopper 97, which is inclined so as to direct the ears from the belt to said rolls. Guards 98, curved as shown, lead from the front extremities of the bars 7, in a converging manner, and are connected to the front ends of the guards 48. Motion is communicated to the elevator at the rear end of the machine through the medium of a cross-belt 99, which passes over the pulley 86 and a companion-pulley 100, the latter being mounted upon the transverse shaft 88 at the lower end of the elevator.

This being the construction, the operation is as follows: As the machine moves along over the field, the operator giving it the proper depression, and the horses traveling at opposite sides of a corn-row, the stalks are successively guided by the guide-bars 98 and the feed-chains 51 to the auger-like ends of the stripping-rolls, which ends act to draw the stalks thereinto. The spiral action of the rolls serves to strip the stalks of the ears, the latter being carried to the rear of the rolls while the stalks themselves are discharged from between the rolls and upon the ground. The ears are carried by the endless chains 51 to the apex or highest point of the inclined feed-table 95, (see Fig. 2, wherein the dumping-table 95 is shown,) down the rearwardly and downwardly inclined rear portion of which they slide or roll until delivered upon the endless belt 84, by which they are carried to the hopper at the end of the belt and by the latter delivered to the husking-rolls 75. The belt 84 presses the ear upon the rolls, and the latter revolving together catch the husks, drawing the same from the ear as the ear is fed from one end of the rolls to the other, so that by the time it reaches the end of the rolls it is completely husked. The belt 84 derives motion from the gear 46 and, through the mechanism and gearing heretofore described, communicates motion to the inclined conveyer, up which it is carried and delivered into any waiting receptacle. By the peculiar shape and arrangement of the fingers 52 they catch the ears of corn in a vertical or upright manner as the latter are stripped from the stalks and thus rapidly carry them so that they are not pinched or shelled by the further action of the stripping rolls. And furthermore, the upturned portions of fingers 52 are adapted to engage those stalks which have fallen or are leaning slightly, in order to bring them to an upright position. And a further function for the upturned ends of fingers 52 is that they project perpendicularly from the platform 95 as the endless chains pass thereover, and thus aid in carrying the ears of corn to the apex or highest point of said platform. The fingers without the upturned portions are not as effective in carrying the ears up the inclined front portion of the platform 95.

From the foregoing description in connection with the accompanying drawings, it will be seen that I have provided a machine which when compared with its various operations is extremely simple as to the mechanism employed for carrying out the same.

It will be obvious that changes as regards the gearing will readily suggest themselves to the skilled mechanic and therefore I do not limit my invention to the many details herein shown and described, but hold that my invention comprehends such changes as may be reasonably ascribed to mechanical skill and experiment, when practically carried out and demonstrated.

As previously stated, the rolls 55 are tapered from the bases of their conical ends rearwardly. The object of this is that I have found by experience the stalks will enter much more readily between the conical ends of large rolls than small ones, inasmuch as they present a larger space; and furthermore I have found that there is an objection to the large rolls in that they injure the corn, where the small rolls would not. I have therefore devised the tapered rolls with a view of securing the advantages of both the large and small rolls. In this manner I secure the advantage of a large space for the entrance of the stalks and the rear small portions to act upon the ears.

In the drawings, Fig. 2, the front end of the stripper-frame is depressed somewhat below the normal position, thus causing the rear portion of the platform to incline upward instead of downward toward its rear end. While in this position of the machine the corn will not roll from the apex of the platform to the husking rolls, as intended and as herein before described, yet the operation of the machine will be the same for the reason that succeeding ears will crowd those in front and push them to the husking rolls.

The bars 29 and the link rods 28 constitute a device for connecting the two tongues together so that both tongues control the machine when the operating lever 30 is engaged with the segment rack. Without said device the tongue upon the opposite side of the vehicle from the operating lever would be free to play up and down and the horse attached thereto could not assist in the support of the machine in desired position. In other words, the parts 28 and 29, serve as a controlling connection between the tongues and the body of the harvester, whereby both tongues operate together; the inclination of the framework being governed by the hand lever 30.

Having described my invention, what I claim is—

1. In a corn harvester, the combination with the axle, the framework mounted thereon, and carrying stripping mechanism, and the draft-bars loosely hinged to the framework and carrying single-trees, of the shaft secured to the framework and terminating in depending arms, the curved braces 29 connecting said arms to the draft-bars the lever 30 pivoted to one of the draft-bars and having its lower end connected by a link to the frame work, and means for locking said lever in the desired position, whereby the front end of the framework may be elevated or depressed at will to suit the height of the corn, substantially as set forth.

2. In a corn-harvester, the combination with the axle, the stripper-bearing framework mounted thereon, the draft-bars pivotally connected to the framework, and the operating lever pivoted to draft-bar and connected to the framework, of the shaft mounted upon the framework, and connecting braces 29 connecting the depending-arms of said shaft to the draft-bars, substantially as set forth.

3. In a corn-harvester, the combination with the main frame, the axle, and the stripping mechanism, of the husking rolls running in contact, means for transmitting motion from the axle thereto, a double inclined conveyer platform extending from the stripping mechanism to the husking rolls, and endless belts traveling over the front upwardly inclined portion of said platform, to its apex substantially as set forth.

4. In a machine of the class described, the combination with the frame, the axle, the wheels, the gathering and stripping-mechanism, of a pair of transversely-disposed husking-rolls, a belt arranged obliquely over the same, a conveyer from the stripping-mechanism to the husking-rolls, means for operating the rolls and means for operating the belt, substantially as specified.

5. In a machine of the class described, the combination with the framework, the axle, the gathering and stripping mechanism, means for operating the same, of a pair of transversely-disposed parallel husking-rolls running in contact, means for operating the same, a belt arranged obliquely over the rolls, means for operating the belt, the chute 95 leading from the stripping mechanism to the belt, and terminating in a hopper 97 beyond the end of the belt and over the husking-rolls and endless conveyer belts traversing a portion of said chute to the apex or highest point thereof, substantially as specified.

6. In a machine of the class described, the combination with the framework, the axle, the master-gear on the latter, the stripping-rolls journaled in the framework, the guards above the rolls, the front and rear sprocket-shafts provided with sprocket-wheels, the feed-chains thereon and passing at the inner sides of the guards, beveled gears on the rear sprocket-shafts, gears 69 on the rear ends of the stripping-rolls engaging each other, a pinion on one of said rolls, the transverse shafts 43 and 70, the gears 47 and 73, mounted respectively on said shafts, the sprocket 44, the chain 45 connecting the same with the master-gear, the opposite beveled gears 46 on the shaft 43 engaging the beveled gears of the rear sprocket-shafts, the pinion 71 on the shaft 70 engaging the pinion 72 of the stripping-roll, of the rear bars 73, the rolls 75 running in contact and journaled in the bars and transversely-disposed with relation to the stripping-rolls, the gears 76 on the ends of the rolls engaging each other, the sprocket 77 on the front roll, the sprocket 79 on the shaft 70, the chain 78 connecting the sprockets 77 and 79, the shafts 81 and 82 extending from the frame at an angle to the husking-rolls and provided with the pulleys, the endless belt 84 passing over the pulleys, the table and chute 95 leading from the stripping-mechanism to the belt, the conveyer 89 having the upper and lower shafts, the latter carrying a pulley 100 and the two being provided with sprocket-wheels, a sprocket-belt passing over the wheels, a pulley 86 mounted on the shaft 82, a cross-belt 99 connecting the same with the pulley 100, and a beveled gear 101 mounted on the front end of the shaft 82 and engaging one of the beveled gears 46, substantially as specified.

7. In a corn-harvester, the combination with a tilting framework, the stripping mechanism carried thereby, the husking rolls, means for operating said stripping mechanism and husking rolls, and a chute extending from the stripping mechanism to the husking rolls, of endless conveyer belts arranged above the stripping mechanism and traversing said chute, said belts being provided with fingers having upturned ends, substantially as set forth.

8. In a machine of the class described, the combination with the stripping-rolls, the front and rear sprockets, means for operating the rolls and sprockets, of the opposite endless chains passing around the sprockets, and the U-shaped engaging-spurs 52 secured at intervals to the chains and having their upper ends bent as at 53, substantially as specified.

In testimony that I claim the foregoing as my own I have hereto affixed my signature in the presence of two witnesses.

JAMES SIMSER.

Witnesses:
ALBERT JOHNSON,
J. JULIUS STROEHLE.